United States Patent Office 3,263,572
Patented August 2, 1966

3,263,572
FAILURE CORRECTING DEVICE
Luther D. Sunderland, Apalachin, N.Y., assignor to General Electric Company, a corporation of New York
Filed Oct. 17, 1963, Ser. No. 316,985
8 Claims. (Cl. 91—176)

This invention relates to a redundant actuator mechanism which insures proper operation if one actuator device fails. While the invention arose in response to the need for improved actuator reliability in flight control systems, the invention can be employed in control systems generally where it is necessary to transform information signals, such as electrical control signals into mechanical displacements to perform work or represent information in a mechanical form.

There is increasing emphasis being placed upon the safety and reliability of automatic flight control systems due to the extreme importance of the automatic control and stabilization functions in modern high-speed vehicles. In man-carrying vehicles such as hydrofoil craft, supersonic aircraft, and re-entry vehicles, a failure in the automatic control system may cause loss of the vehicle or at least prevent completion of a mission. In unmanned vehicles, a failure will cause mission failure. To meet these reliability and safety requirements, redundancy and automatic failure correcting techniques have been applied to automatic control systems.

The ideal design objective for a fail-safe highly reliable control system is for the system to continue operating in an undegraded fashion and without any undesirable transients when an internal failure occurs in any portion of the system. A typical prediction for improved reliability of actuators with failure correction features is the multiplication of the mean-time-between-failures by a factor of 1,000 with reasonable allowance for the added complication. In practice, this promised improvement through redundancy has been found to be very difficult to achieve.

A natural approach to failure correction is to provide three actuator devices. Three is a convenient number because it provides a minimum basis upon which the performance of the individual actuator devices can be compared to determine which device has failed. Since the objective is to insure continuous operation, it is desirable to have a failed actuator completely removed from the system and to have its function replaced by another actuator device without any effect on system operation. While as a practical matter this is impossible, a first step is to have a plurality of actuator devices operating in parallel to produce an additive output through a differential. This results in a device failure being only a fractional system failure and simplifies take-over by the remaining actuator devices. However, reliance on a conventional differential, in which the ratio of one input displacement to the output is 2:1, is not normally tolerable as a steady state condition after the failure of one input.

Another problem area for providing successful redundant actuators is caused by the analog nature of the mechanisms. As opposed to mechanisms of a digital nature, it is necessary to permit output values over the continuous range of the mechanism. In practice, this requires an arrangement which permits separate motion of some kind within the allowable error limits which is then combined, after which it is difficult to identify the source of error. Frequently conditions result where the actuators can fight one another so as to cause instability, induced failures, etc.

Accordingly, it is an object of the invention to provide a failure correcting actuator mechanism in which small differential motion is permitted but which before and after failure correction has a 1:1 input to output relationship.

Another object of the invention is to provide a redundant actuator mechanism having a substantially undegraded output after failure correction but which incorporates differential operation during failure correction to effectively minimize the transient effects.

Briefly stated, in accordance with certain objects of the invention, a redundant actuator mechanism is provided in which two actuator devices normally are coupled to an output member with a differential arrangement. Provision is made so that differences in motion between the two actuator devices cause a majority comparison with a dummy actuator device. In accordance with the majority decision, the failed actuator device is locked out and the remaining actuator takes over with a 1:1 input to output relationship.

The key feature of the actuator mechanism is that the actuator devices are not mounted rigidly, but are supported in a linkage. They are arranged so that their respective output members are both directly coupled to the output member of the mechanism while their normally fixed housing members are coupled to the mechanism platform through a differential. When the failed actuator device is removed, the differential is locked so that the remaining actuator device operates in an unhampered manner, effectively as a single non-redundant actuator.

These and other objects of the invention may best be understood by referring to the following description taken in conjunction with the appended drawings in which like numerals indicate like parts and in which.

Figure 1:
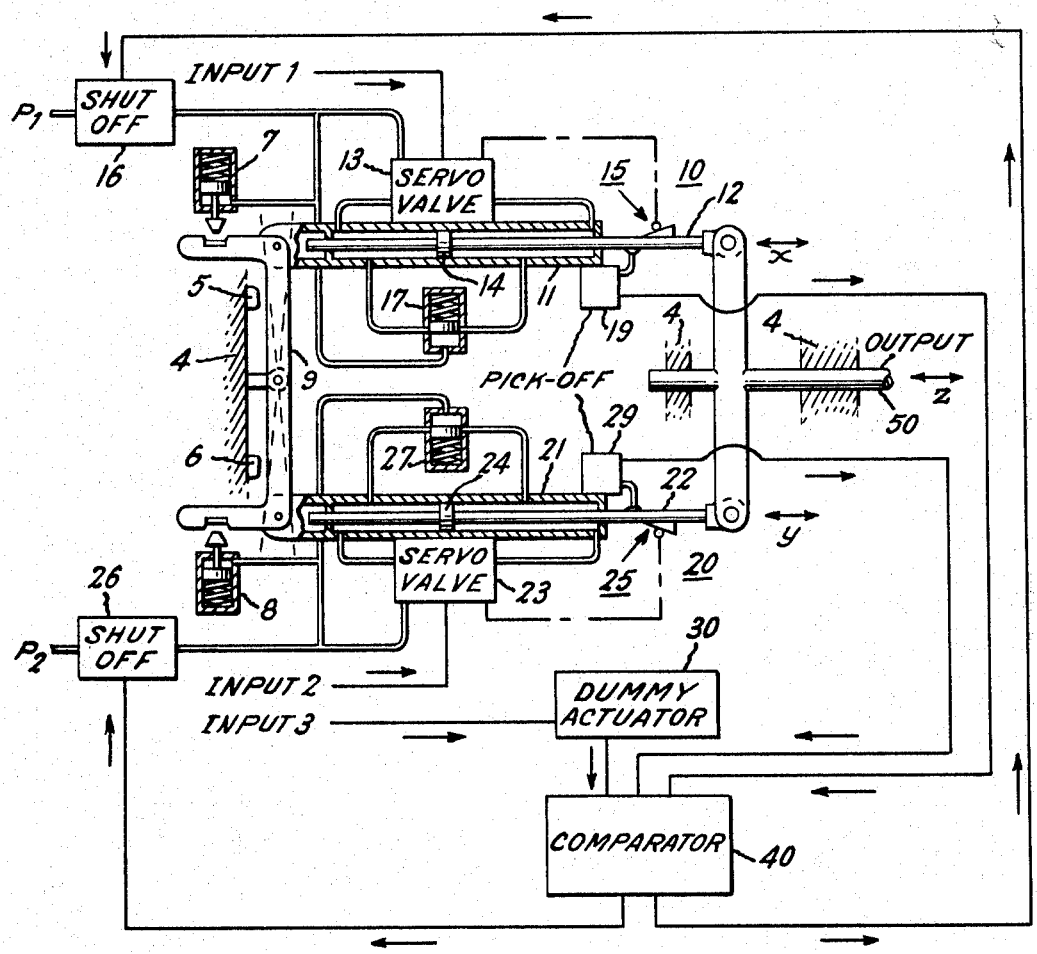
FIGURE 1 is a schematic diagram, mostly mechanical, of a first embodiment of the invention.

Referring now to the drawings, FIGURE 1 illustrates a first embodiment of the failure correcting actuator. A pair of standard servo actuator devices 10 and 20, responsive to electrical input signals 1 and 2, are both directly coupled to a slider 50 which is the output member of the overall actuator. A dummy actuator device 30 is also provided so that a comparator 40, responsive to actuator devices 10, 20 and 30, can determine which actuator device has failed and generate the appropriate control signals for its disengagement and take-over by the other actuator device.

The invention resides essentially in the arrangement whereby the actuator devices are coupled together. In a non-redundant actuator, the actuator, device is the complete actuator. The actuator device is mounted on a platform and an input signal causes an output element, usually a slider, to be displaced relative to the device housing which is rigidly fixed to the platform. In the FIGURE 1 actuator, the actuator device housings 11 and 21 are not mounted on the platform 4, but are connected to the mounting platform 4 by differential lever 9. This provides the basis for the desired operating characteristics. Without a failure, the actuator devices 10 and 20 operate as if they were inputs to a differential providing displacements $x$ and $y$ and the output slider 50 is displaced by $z=\frac{1}{2}(x+y)$. After a failure, the failed actuator device is disabled and the lever 9 is locked in a manner to be described later. This results in a condition whereby the output slider is displaced directly by the remaining actuator device by $z=x$ or $z=y$, which is equivalent to latching the actuator device housing 11 or 21 to the platform 4 and using its output slider 12 or 22 as the mechanism output directly.

The FIGURE 1 actuator devices 10 and 20 have been shown as standard electro-hydraulic servo actuators wherein the output sliders 12, 22 are displaced by pistons 14, 24 in accordance with the hydraulic line pressure applied to the actuator housing cylinders 11, 21 which is controlled by the electrically operated servo valves 13, 23. These actuators 10 and 20 are essentially transducers which transform an electrical input signal into a corresponding mechanical displacement output in accordance with the position feedback 15 and 25. While the electro-hydraulic actuators 10 and 20 have been refined to a high state of development, other actuator devices can be employed. Electric motors which provide the desired relationship between the input and the output displacements are representative. Also, where the control signals are generated in some form other than electrical, a transducer accepting the generated input signal and providing the equivalent mechanical displacement would be used. Whatever transducer is used must also have provision for deenergization and for effectively being disconnected from the output slider 50. The electro-hydraulic actuator devices 10 and 20 are deenergized by shut off valves 16 and 26 for disconnecting the hydraulic power which are controlled by the output of comparator 40. The actuator devices 10 and 20 are effectively disconnected from the final output slider 50 by bypass valves 17 and 27. These valves are normally closed by means of the hydraulic line pressure overriding the spring bias towards the open position and have no effect on their actuators. However, when a shut off valve 16 or 26 is closed, the removal of line pressure causes the corresponding bypass valve 17 or 27 to open. The result is that output slider 50 can move freely with slider element 12 or 22 following because the bypass valve permits the hydraulic fluid moved by the corresponding piston to flow freely.

Figure 2:
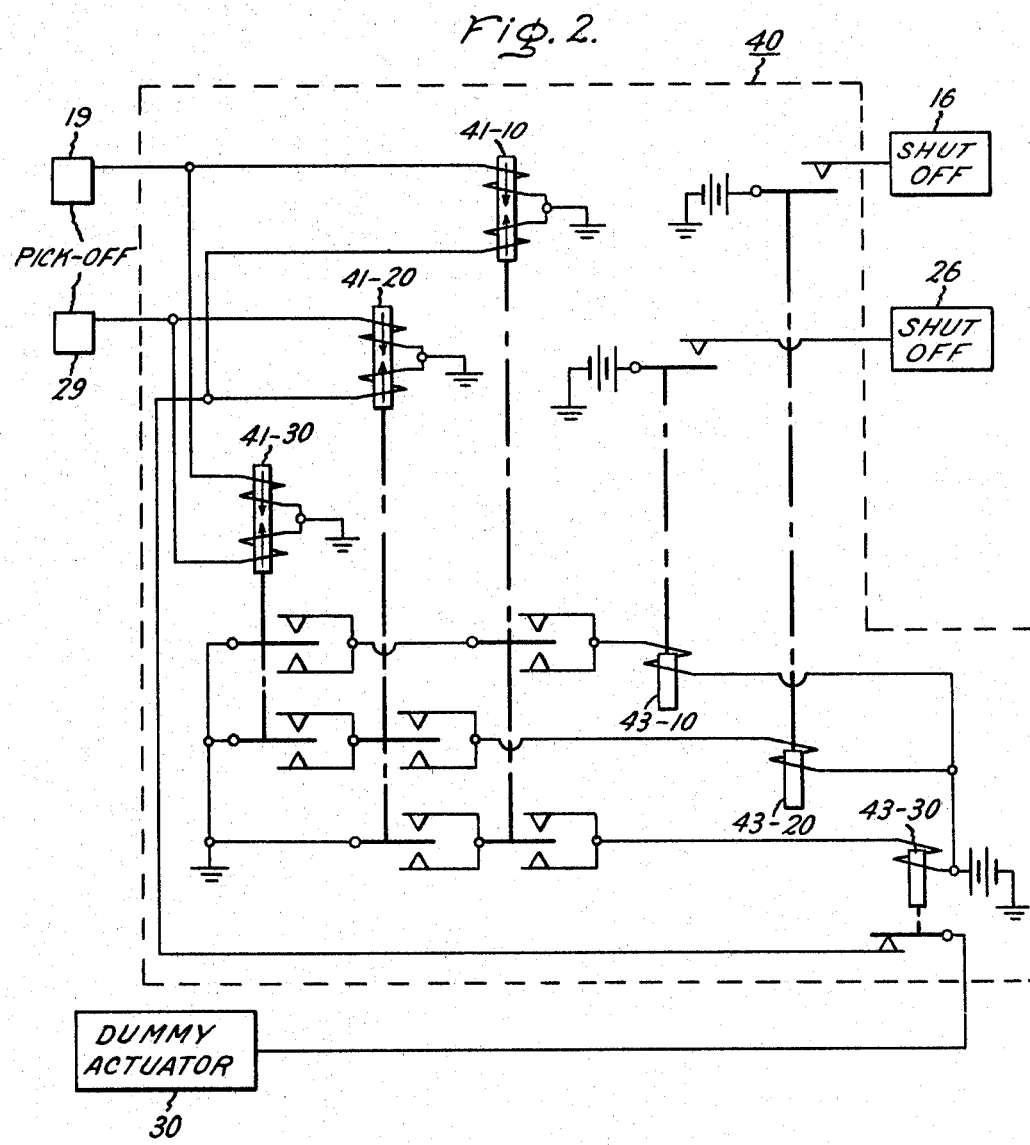
FIGURE 2 is a schematic wiring diagram illustrating comparator apparatus in the FIGURE 1 embodiment.

FIGURE 2 is a schematic diagram of one form of comparator 40 in the FIGURE 1 actuator mechanism. Because a difference between the output displacements $x$, $y$ of the actuator devices 10 and 20 can be one being high or the other low, it is necessary to provide detection means for determining which case exists. Accordingly, pick-off devices 19 and 29, conveniently linear variable differential transducers (LVDT's) or synchros, are put on slider 12 and 22, respectively, to generate appropriate electrical signals proportional to outputs $x$ and $y$. These signals are applied to signal comparators in the form of a simple relay logic matrix comprised of three voltage sensitive relays 41–10, 41–20 and 41–30. The output of the dummy actuator 30 is also applied to this matrix wherein each relay has a pair of opposing coils such that a normally open contact is closed whenever the applied voltages differ by an amount exceeding an allowed limit. As shown, the $x$ and $y$ signals from pick-offs 19 and 29 are connected to windings on relays 41–10 and 41–20, respectively. These same signals are also applied to the respective windings of relay 41–30 which is *not* responsive to the dummy actuator 30. The signals from the latter are applied to the second coils in both relays 41–10 and 41–20. Therefore, if either actuator device 10 or 20 has failed, a normally open contact in 41–30 is closed and one of the normally open contacts in 41–10 or 41–20 is also closed, whereby a distinct combination of two out of three relay contacts will be closed. As a result, one relay in a second set of three relays 43–10, 43–20 and 43–30 is energized so as to actuate shut off valve 16 or 26 or inactivate the dummy actuator 30. The relay 41–30 insures that relay 43–10 or 43–20 can only be energized if either actuator device 10 or 20 fails, that is, *not* if dummy actuator 30 fails. With this type of comparator there is no basis for comparisons when the dummy actuator fails. Accordingly, relay 43–30 is provided to shut off dummy actuator 30.

While the comparator 40 utilizes electrical relays, is responsive to electrical signals, relies on a dummy actuator, and utilizes a majority logic for failure detection, the possible variations are very numerous. The use of a dummy actuator 30 which is an electrical device such as a transformer, together with filter networks, for translating a third input signal into a form simulating the actuator dynamic response characteristic and compatible with the pick-off devices 19 and 28 saves substantial size, cost, weight, etc. However, a third electro-hydraulic servo actuator device, similar to devices 10 and 20, can be employed. The majority logic can be implemented in many forms and can utilize various electronic components other than electro-mechanical relays such as solid state switches. In fact, the logic can be performed with mechanical or hydraulic components. In some situations, neither a dummy actuator 30 or a majority comparator are required. If the operating characteristics of the actuator devices 10 and 20 are sufficiently well known in a particular application, failure detection can be based directly on detection of variations from such characteristics. A simple example is where all or nearly all failures are characterized by maximum possible rates of change in the outputs $x$ or $y$. A monitor responsive to a rate of change in an $x$ or $y$ pick-off signal exceeding a given limit could deenergize that failed actuator. The invention is primarily directed to utilizing a failure detection signal, once the failure is detected and identified.

The operation of the lever arm 9 as described above is quite unusual. In some respects the arm 9 is neither a lever nor a differential mechanism. A lever is normally understood to be a bar connected to three other links. When it is used as a differential mechanism or adder, two links introduce input displacements and the third link provides the output displacement. However, in the FIGURE 1 embodiment, the mounting platform 4 corresponds to the third link, and it is fixed. As compared with a lever with a fixed pivot or fulcrum, there are difficulties because neither actuator device 10 or 20 can be *the* input and the other *the* output. Nevertheless, the linkage provides the desired operation. The output slider 50, before failure, is displaced in accordance with the average of the $x$ and $y$ displacements; and, after failure and centering of lever 9, it is displaced in accordance with the actuator device which has not failed with a 1:1 ratio. It will be noted that the pivoted coupling between the respective actuator device sliders 12 and 22 and the output slider 50 is for ease of construction. Functionally, these elements are fixed relative to one another.

A major advantage of the FIGURE 1 embodiment is that the differential lever attenuates the undesired effects on the output during a failure correction transient when a "hard-over" or error spike is introduced. In this embodiment, the limit stops 5 and 6 limit free differential motion. Displacements exceeding these limits results in the actuator devices opposing one another, which contributes to the attenuation in the output. However, the limit stops 5 and 6 are not essential to the invention. The primary limits are those to which the comparator 40 is adjusted to. With electro-hydraulic actuators, it has been found that by adjusting the comparator to respond at any displacements up to the limit stop engagement, differential displacement transients are typically limited to a tenth of a second in duration or less. While the servo loops for each actuator device will fight one another when a limit stop 5, 6 is struck, the opposition forces are sufficiently reduced to substantially avoid failures during correction, while contributing attenuation of transients in the output. Alternatively, the limit stops 5 and 6 can be replaced by parallel switches in series with shut off valves 16 and 26, one of which must be operated to enable failure correction, replacing the portion of comparator 40 which prevents failure correction with a dummy actuator failure.

While the FIGURE 1 embodiment utilizes a linkage type differential with the normal output member fixed, other differential mechanisms, such as the rack or spur gear differential, having their normal output members fixed can be used. Where instead of a linear output displacement, an angular displacement is required, a bevel gear differential is suitable.

Figure 3:
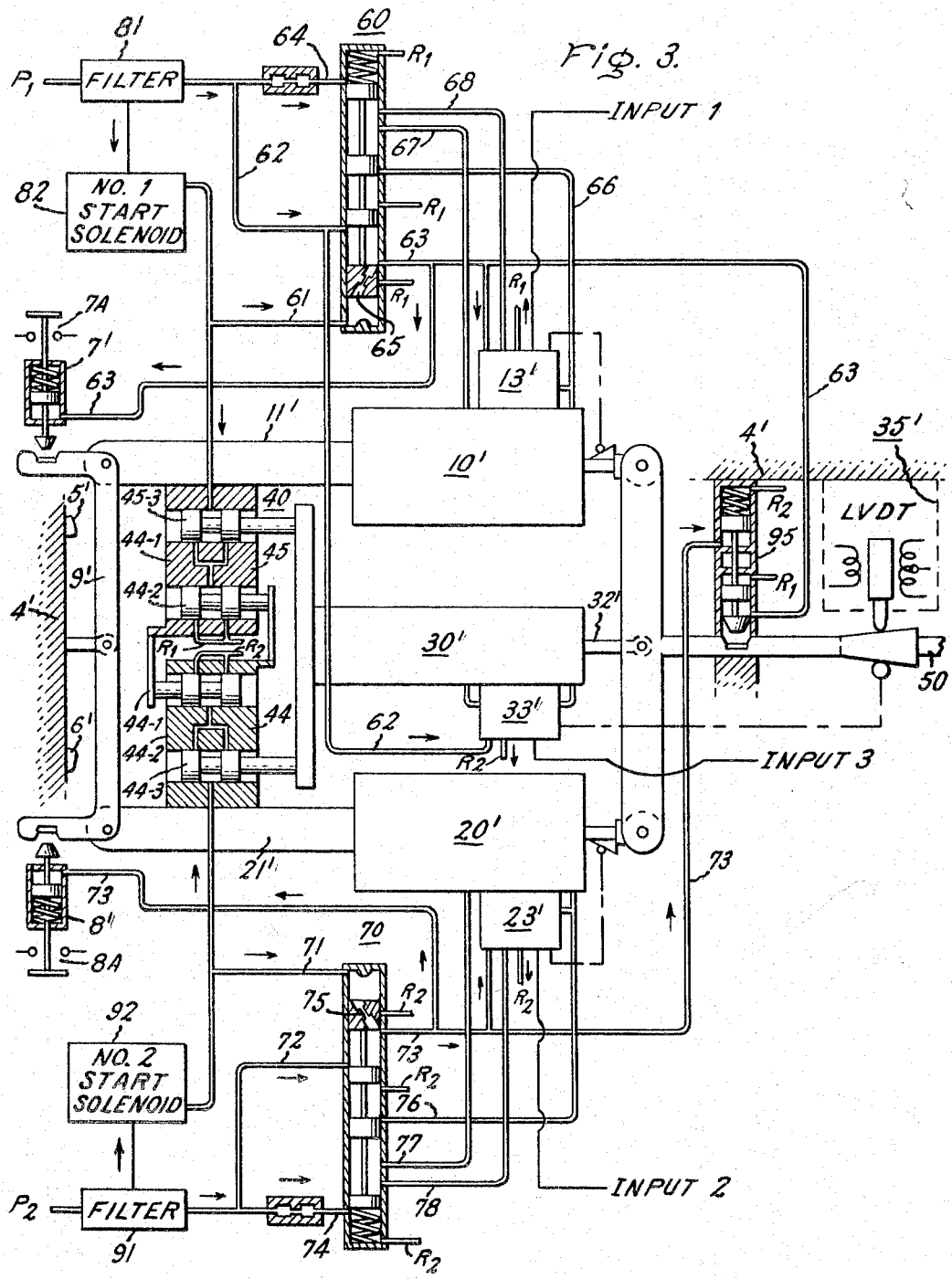
FIGURE 3 is a schematic diagram of a preferred embodiment of the invention.

FIGURE 3 is a schematic diagram of a preferred embodiment of the invention utilizing hydraulic error detection and failure correction control. It is also illustrative of some variations in details of implementation of the invention. However, those elements in this embodiment which are basically the same as those in FIGURE 1 such as electro-hydraulic servo actuators 10' and 20' are designated with the same reference characters primed.

The dummy actuator 30' in this embodiment is an electrohydraulic servo actuator having its slider 32' pivoted on output slider 50' and having comparison valve spools 44-3 and 45-3 fixed to its housing 31'. With this arrangement, in the absence of a failure, the housings 11', 21', 31' of the servo actuators remain in a neutral position, the housing 31' of the third actuator 30' being displaced from the slider 50' in accordance with the slider feedback 35' and input 3 by an amount equal to the displacement of slider 50' from the housings 11' and 21' which cancels. The comparison valves 44 and 45 detect differential motion of the housings and determine which servo actuator device has failed. When either actuator device 10' or 20' fails, its housing 11' or 21' will be displaced relative to the other housings. When this actuator device housing moves relative to the others, the valve housing 44-2 or 45-1 fixed thereto is displaced relative to its spools 44-1 and 44-3 or 45-3 and 45 whereby both spools in one of the valves are moved to an open position. The opening of valve 44 or 45 is used to close down the failed actuator device 10' or 20'.

The ON-OFF control function for actuator devices 10' and 20' are primarily performed by shut off-bypass valves 70 and 80 which perform the combined functions of valves 16', 17', 26' and 27' in FIGURE 1. The spools of valves 70 and 80 are spring biased to a shut off position for the respective pressure lines $P_1$ and $P_2$. When a start signal is applied to start solenoids 82 and 92, hydraulic impulses are applied therethrough to the shut off-bypass valves against the spring bias to displace the valves to the ON position. The line pressures $P_1$ and $P_2$ through filters 81 and 91 hold these shut off-bypass valves in the ON position. Because of the restricted passages 65 and 75 to the end faces of the valve spools opposing the spring bias, the line pressures $P_1$ and $P_2$ normally maintain the valve spools in the ON condition shown. However, when either valve 45 or 44 is opened, the pressure drops in line 61 or 71, respectively, to the return or sump level $R_1$ or $R_2$. This causes the shut off-bypass valve 60 or 70 to return to the OFF condition because the pressure on the spool end face drops from line pressure $P_1$ or $P_2$ towards the return pressure $R_1$ or $R_2$. In the OFF condition, shut off-bypass valve 60 or 70 disconnects line pressure from servo valve 13' or 23', connects a bypass channel for housing cylinder 11' or 21', and locks the differential lever 9' by means of latch 7' or 8'.

In the ON position, shut off-bypass valves 60 and 70 connect line pressures $P_1$ and $P_2$ to servo valves 13' and 23' through lines 63 and 73 from lines 62 and 72. In order to reduce undesirable interactions after an actuator device is shut off, a connection from servo valves 13' and 23' to housing cylinders 11' and 21' is made from lines 68 and 78 to lines 67 and 77 through the valves 60 and 70 which are cut off in the OFF position. The force opposing the spring bias in valves 60 and 70 is determined by the line pressure $P_1$ and $P_2$, the relative area of the spool end faces and the restrictions in line 64, 65, 74 and 75. When valve 44 or 45 is opened, the pressure in lines 64 and 74 assist the spring bias towards the OFF position.

When shut off-bypass valves 60 and 70 are in the OFF position, pressure connecting lines 63 and 73 to the servo valve are switched from the $P_1$ and $P_2$ pump lines 62 and 72 to the $R_1$ and $R_2$ sump lines 69 and 79. This also disconnects pressure from spring-bias latches 7' and 8' which therefore lock differential lever 9'. The bypass connection for each actuator device is made from lines 66 and 76 to lines 67 and 77.

As in the FIGURE 1 embodiment, after failure of actuator device 10' or 20', the differential lever 9' is locked by the respective locking device 7' or 8'; the failed actuator device is inactivated by the shut off-bypass valve 60 or 70 which removes the operating pressure and opens a cylinder bypass connection; and the remaining actuator device operates in a manner equivalent to a non-redundant actuator. A feature of the FIGURE 3 embodiment is in the nature of an additional failure correcting action for two failures, although the failure is not corrected by the actuator itself. In the event that any two of the actuator devices 10', 20' and 30' fail, both shut off-bypass valves 60 and 70 assume an OFF position because of the opening of both valves 44 and 45. The resulting removal of pressure $P_1$ and $P_2$ from lines 63 and 73 is used to operate an additional spring biased locking device 95 which latches the final output slider 50' to a neutral position. Conveniently, the locking devices 7' and 8' include switches 7A and 8A which are useful for initiating corrective action or for providing a visual indication of actuator failures.

While the failure detection function is performed in a relatively simple and convenient manner by valves 44 and 45 in FIGURE 3, numerous hydraulic variations are possible. The relative displacement between each spool and the valve housing is a direct subtractive comparison of the elements to which they are attached. The valves 44 and 45 perform three comparisons: spool 44-3 and housing 44-2 compare device 30' against device 20'; spool 45-3 and housing 45-1 compare device 30' against device 10'; and both housing 45-1 and spool 44-1 compare device 10' against spool 45-2 and housing 44-2 which are fixed to device 20'. Accordingly, the three possible pairs of comparisons are made. The results of these comparisons are combined in accordance with the desired "AND" logic by series connection in pairs so that an open line results if and only if 10'≠30' and 10'≠20' for valve 45 and 20'≠30' and 20'≠10' for valve 44. Either of these conditions results in closing down a respective actuator device. In FIGURE 3 this is performed by having the open positions of valves 44 and 45 remove the pressure holding valves 60 and 70 in the ON position against the spring bias. An example of variations is where the pressure lines 62 and 72 for $P_1$ and $P_2$ are connected to the shut off-bypass valves 60 and 70 directly through the respective halves of normally open valves 45 and 44 which are connected in parallel.

In the illustrated embodiments, each actuator device is part of an independent hydraulic system, is normally continuously operated as a non-redundant actuator, and the output of each actuator device is essentially used directly for failure detection. The actuator has both the desired differential relationship before failure and the desired direct output relationship after failure correction. Furthermore, this is obtained without requiring *any* change in the actuator device and its associated hydraulic system which is destined to take over. Failure correction is performed by changing the failed actuator device only, by removal, and center locking the differential device. This permits the failure correction operation to be performed remarkably fast and in an inherently stable manner. In fact, it is desirable to slow down the response under certain circumstances to avoid nuisance disengagements caused by spurious failure detection signals, because the failure correction operation is essentially irreversible. The key function in this regard is that of the shut off valve. As is evident from the FIGURE 3 embodiment, the dynamic response characteristics of the shut off-bypass valves 60 and 70 can be tailored to provide the best compromise of fast response and insensitivity to nuisance disengagements. In fact, by proper selection of the hydraulic component parameters such as restrictions 65 and 75, the system is designed to provide response characteristic tailored to the type of failure as reflected in the error detection signals.

While particular embodiments of the invention have been shown and described herein, it is not intended that the invention be limited to such disclosure, but that changes and modifications, such as reversing the connections between the actuator device housing and output element on the one hand and the mounting platform and final output element on the other, can be made and incorporated within the scope of the claims.

What is claimed is:

1. A failure correcting actuator wherein a final sum output element is displaced relative to a mounting platform by two actuator devices, each having a housing and an output element comprising:
    (a) said first and second actuator devices responsive to control signals for displacing the device output element relative to the device housing;
    (b) said final output member directly coupled to both of said device output elements;
    (c) a differential device having a normal sum output element fixed relative to the mounting platform and having input elements coupled to said actuator device housings so that some differential displacements of said device output elements are normally allowed by displacement of said device housings while said final output member is displaced by the average of said device output element displacements;
    (d) failure correcting means responsive to said device output element displacements for detecting actuator device failures and correcting therefor by disengagement of the failed actuator device and by locking said differential mechanism.

2. A failure correcting actuator comprising:
    (a) first and second actuator devices having output elements displaceable relative to respective housings;
    (b) a final output member coupled to both of said device output elements;
    (c) a differential device having a normal sum output element adapted to be fixed relative to a mounting platform and having input elements coupled to said actuator device housings;
    (d) failure correcting means responsive to said devices for detecting actuator device failures and correcting therefor by disengagement of the failed actuator device and by locking said differential mechanism.

3. In a flight control system having failure correcting mechanization whereby failure of a component is detected and its function is taken over by other apparatus, a servo actuator responsive to three redundant electrical control signals for producing mechanical displacements relative to a mounting platform proportional to the redundant electrical control signals comprising:
    (a) a final output member adapted to provide the desired mechanical displacement output;
    (b) a pair of actuator devices, each actuator device being responsive to one of the redundant electrical control signals for producing a corresponding mechanical displacement of an output element relative to a housing, said final output member being coupled to said actuator output elements in such a manner that it is displaced in accordance with the displacement of each individual actuator element relative to the mounting platform;
    (c) a differential device coupling said actuator devices to the mounting platform for allowing differential actuator output element displacement whereby the housings of said actuators are displaceable relative to the mounting platform;
    (d) failure correcting means responsive to said actuator devices for detecting an actuator device failure and for locking said differential device.

4. A failure correcting actuator comprising:
    (a) first and second actuator devices for transforming electrical control signals to mechanical displacements of respective output elements relative to their housings;
    (b) a combined output member fixed to said respective actuator device output elements;
    (c) a mechanical differential device of a type having a resultant portion thereof normally displaced by an amount proportional to the average displacement of two input portions;
    (d) means coupling the respective actuator device housings to said input portions and for coupling said resultant portion to the mounting platform;
    (e) a locking mechanism for said differential device normally disengaged;
    (f) failure correcting means responsive to said first and second actuator devices for detecting failure by one of said actuator devices and thereafter engaging said locking mechanism.

5. The failure correcting mechanism of claim 4, further comprising:
    (g) a third device responsive to input control signals for deriving a third output signal suitable for performing majority logic with the output signals of said actuator devices;
    (h) majority logic means incorporated in said error correcting means, responsive to said actuator devices and said third device for comparing their output signals whereby displacement of one of said actuator output elements differing from the other two comparator signals by an amount greater than a selected limit value to identify the failed actuator.

6. A failure correcting actuator comprising:
    (a) first and second actuator devices, each device transforming electrical control signals to mechanical displacements of a first device part relative to a second part;
    (b) a combined output member fixed to one part of each of said respective actuator devices;
    (c) a two input mechanical differential device of a type having a resultant portion thereof normally displaced by an amount proportional to the average displacement of two other input portions;
    (d) means coupling the remaining part of each actuator device to a respective differential input and coupling said resultant portion to the mounting platform;
    (e) locking mechanism for said differential device normally disengaged;
    (f) failure correcting means responsive to said first and second actuator devices for detecting failure by one of said actuator devices and thereafter engaging said locking mechanism.

7. A failure correcting servo actuator comprising:
    (a) first and second electro-hydraulic servo actuator devices, each device having a slider displaceable relative to a device housing in accordance with an electrical control signal;
    (b) a differential lever, adapted to be pivoted at its center on a mounting platform, and having said actuator device housings pivoted at respective ends of the lever;
    (c) an output slider coupled to both of said actuator device sliders so as to be normally displaced in accordance with the average displacements of said sliders while said lever permits some differential actuator device displacements;
    (d) failure correcting means for detecting differential actuator device displacements exceeding a given limit and generating a correction signal representing which actuator has failed;
    (e) center-lock means responsive to said correction signal for locking said lever in a center position;

(f) a bypass valve associated with each of said actuator devices responsive to said correction signal for inactivating the failed device.

8. A failure correcting servo actuator comprising:
 (a) first and second electro-hydraulic servo actuator devices, each device having a slider displaceable relative to a device housing in accordance with an electrical control signal;
 (b) a lever, adapted to be pivoted at its center on a mounting platform, and having said actuator device housings pivoted at respective ends of the lever;
 (c) an output slider coupled to both of said actuator device sliders so as to be normally displaced in accordance with the average displacements of said sliders while said lever permits some differential actuator device displacements;
 (d) a third electro-hydraulic servo actuator device, having a slider coupled to said output slider;
 (e) first and second failure detection valves mounted on said first and second actuator device housings, respectively, each detection valve determining if and only if the supporting device housing is displaced relative to both of the remaining device housings, by presenting a combination open or closed condition;
 (f) center-lock means for locking said lever in a center position;
 (g) failure correction valves associated with each of said first and second actuator devices responsive to said failure detection valves for inactivating the failed device by pressure line shut off, making a bypass connection, and activating said center-lock means.

References Cited by the Examiner

UNITED STATES PATENTS

| | | | |
|---|---|---|---|
| 2,898,889 | 8/1959 | Foster | 91—216 |
| 3,070,071 | 12/1959 | Cooper | 91—216 |
| 3,095,784 | 7/1963 | Colhoun | 91—363 |
| 3,124,041 | 3/1964 | McMurty et al. | 91—363 |
| 3,145,330 | 8/1964 | Hecht | 244—77 |

MARTIN P. SCHWADRON, *Primary Examiner.*

SAMUEL LEVINE, *Examiner.*

P. E. MASLOUSKY, *Assistant Examiner.*